(12) United States Patent
Utley

(10) Patent No.: US 9,590,226 B2
(45) Date of Patent: Mar. 7, 2017

(54) BATTERY MOUNTING SYSTEM

(71) Applicant: FORD GLOBAL TECHNOLOGIES, LLC, Dearborn, MI (US)

(72) Inventor: Brian T. Utley, Canton, MI (US)

(73) Assignee: FORD GLOBAL TEHNOLOGIES, LLC, Dearborn, MI (US)

( * ) Notice: Subject to any disclaimer, the term of this patent is extended or adjusted under 35 U.S.C. 154(b) by 287 days.

(21) Appl. No.: 14/312,885

(22) Filed: Jun. 24, 2014

(65) Prior Publication Data

US 2015/0372284 A1 Dec. 24, 2015

(51) Int. Cl.
*H01M 2/30* (2006.01)
*H01M 2/10* (2006.01)

(52) U.S. Cl.
CPC ........... *H01M 2/305* (2013.01); *H01M 2/1083* (2013.01); *H01M 2220/20* (2013.01); *Y10T 29/4911* (2015.01)

(58) Field of Classification Search
None
See application file for complete search history.

(56) References Cited

U.S. PATENT DOCUMENTS 6,827,169 B1 * 12/2004 Van Hout ............... B60R 16/04
                                                          180/68.5
8,168,323 B2     5/2012 Richter et al.

* cited by examiner

*Primary Examiner* — Daniel Gatewood
(74) *Attorney, Agent, or Firm* — David B. Kelley; MacMillan, Sobanski & Todd, LLC

(57) ABSTRACT

A battery is mounted in a hybrid electric automotive vehicle. The battery is held by a restraining bar across top surfaces of a plurality of cells that comprise the battery. A holder is located between the cells and restraining bar to increase a contact area between the restraining bar and the battery.

5 Claims, 3 Drawing Sheets

BATTERY MOUNTING SYSTEM

BACKGROUND OF INVENTION

The present invention relates to automotive traction batteries and in particular to a system for mounting traction batteries in a hybrid electric automotive vehicle.

A hybrid powertrain of an automotive vehicle includes a battery comprised of a plurality of cells. Typically, the battery is secured in the vehicle by clamping a restraining bar across a top surface of the cells. The restraining bar may be fabricated from a high strength, and electrically conductive, material such as steel or from a high strength, electrically non-conductive material such as fiber-reinforced polymer.

However, battery features or components on the top surface of the battery cell may reduce the effectiveness of the restraining bar. The restraining bar is applied to a contact area of the top surface. The potential contact area is commonly reduced by one or more electrical terminals on the top surface. The terminal both reduces the top surface available for the contact area and, when an electrically conductive restraining bar is used, requires electrical isolation from the restraining bar.

SUMMARY OF INVENTION

An embodiment contemplates a vehicle battery mounting system. A battery assembly has a cell. A terminal is fixed to the cell. An insulating holder is located between a top surface of the cell and the terminal, wherein the holder extends, in a direction normal to the top surface, farther out than a portion of the terminal. A restraint secures the cell such that the holder prevents the restraint from contacting the terminal.

Another embodiment contemplates a method of mounting a battery cell in a vehicle. A terminal is fixed to the cell. An insulating holder is placed between a top surface of the cell and the terminal, wherein the holder extends, in a direction normal to the top surface, farther out than a portion of the terminal. The holder is fixed between the battery and a restraint, such that the holder prevents the restraint from contacting the terminal.

Another embodiment contemplates a method of mounting a battery assembly in a vehicle. An insulating holder is placed between a top surface of the battery and a restraint, wherein the holder extends, in a direction normal to the top surface, farther out than a terminal of the battery. The holder is secured between the battery and restraint, such that the holder prevents the restraint from contacting the terminal.

An advantage of an embodiment is a contact area for the restraint is increased. This improves effectiveness of the restraint securing the battery.

DETAILED DESCRIPTION

Figure 1:
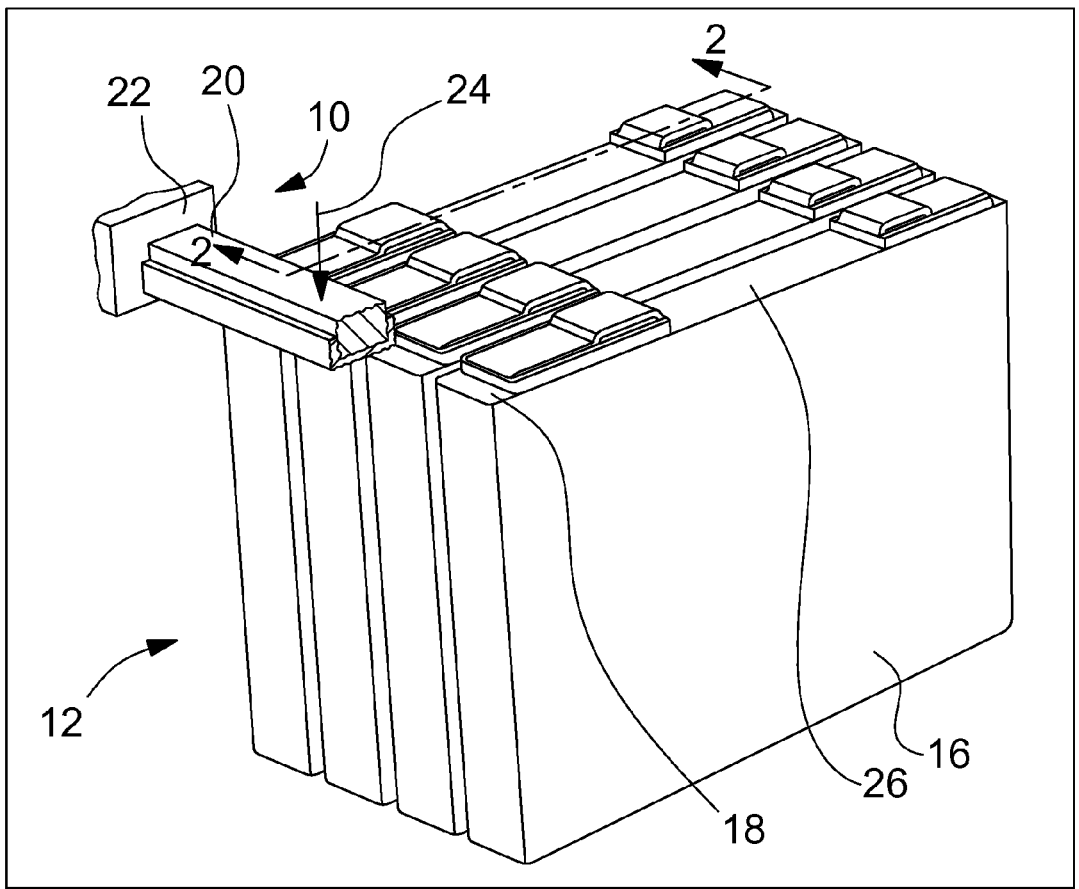
FIG. 1 is a schematic perspective view of a battery restraint according to the prior art.
Figure 2:
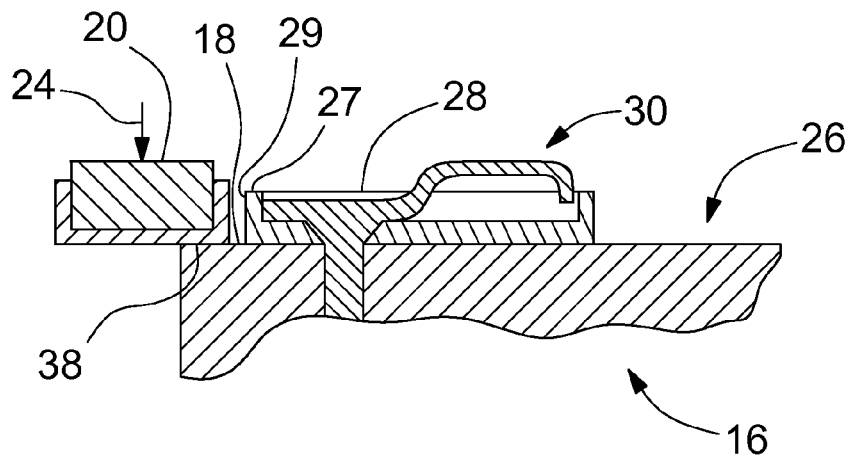
FIG. 2 is a schematic sectional view of a portion of a prior art battery restraint, taken along line 2-2 of FIG. 1.

FIGS. 1 and 2 schematically illustrate a prior art battery securing system 10 for a battery assembly 12 in an automotive vehicle 14. Multiple cells 16, having cell shoulder contact areas 18, are arranged for mounting in the vehicle 14. A restraint 20 is placed across the cell shoulders 18. The restraint 20 is secured to an anchor 22 to exert a downward force (indicated by arrow 24) on the cell shoulders 18. The downward force 24 secures the battery 12 in the vehicle 14. The downward force 24 is illustrated as applied to a left cell shoulder of the cells 16, but as understood by one skilled in the art, the downward force 24 may also be applied to a right cell shoulder opposite the left cell shoulder or both the left and right cell shoulders.

Each cell 16 includes a cell top surface 26, which includes the shoulder 18. The restraint 20 is in contact with the shoulder 18 in a shoulder contact area 38. An insulator 28 is positioned on the cell top surface 26. The insulator 28 may include a perimeter wall 29 having a top surface 27. A terminal 30 is positioned in the insulator 28. The terminal 30 extends through the cell top surface 26 and insulator 28. The terminal 30 is fixed to the cell 16 by a suitable means known to one skilled in the art. For example, the terminal 30 may be fixed to the cell 16 by welding. The insulator 28 may be used to locate or position the terminal 30 prior to fixing the terminal 30 to the cell 16. The terminal 30 may be used to restrain the insulator 28 while the terminal 30 is fixed to the cell 16. The terminal 30 is electrically connected to a high voltage bus of the vehicle 14.

Figure 3:
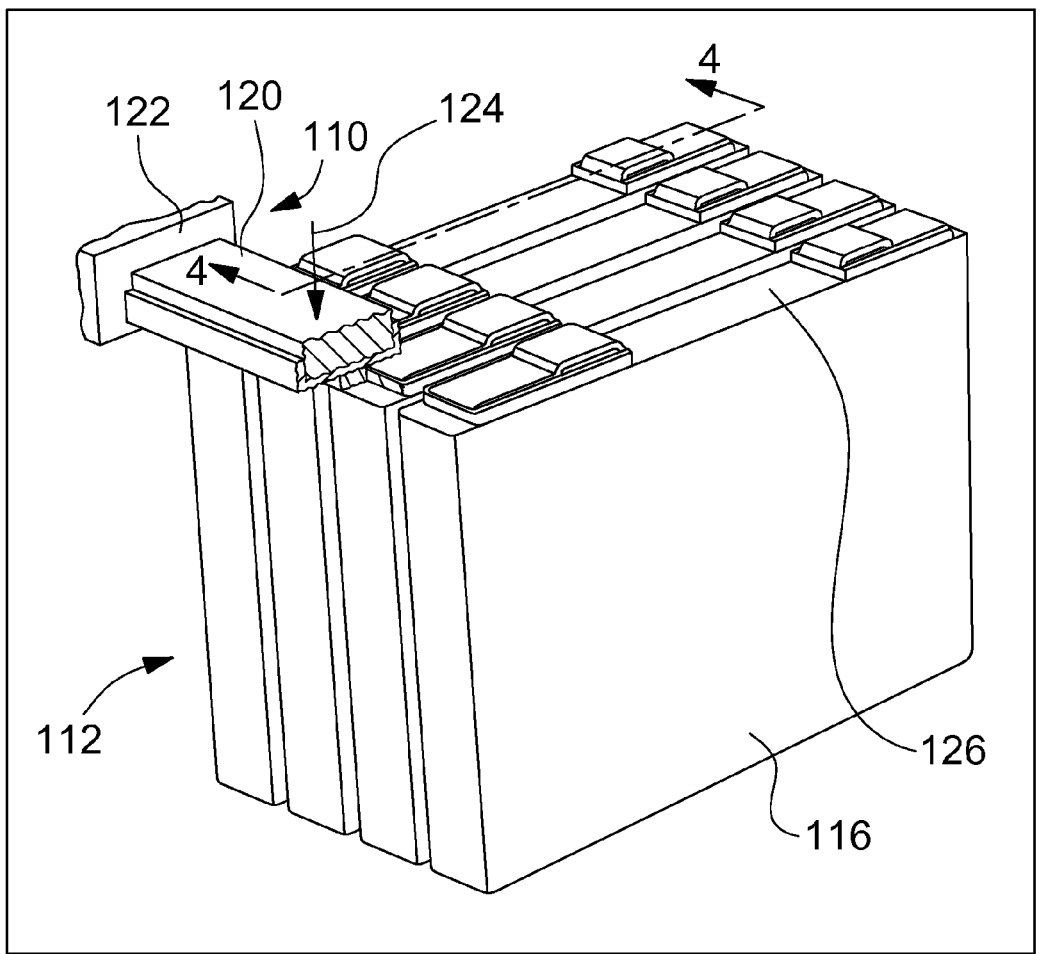
FIG. 3 is a schematic perspective view of a battery mounting system according to the present invention.
Figure 4:
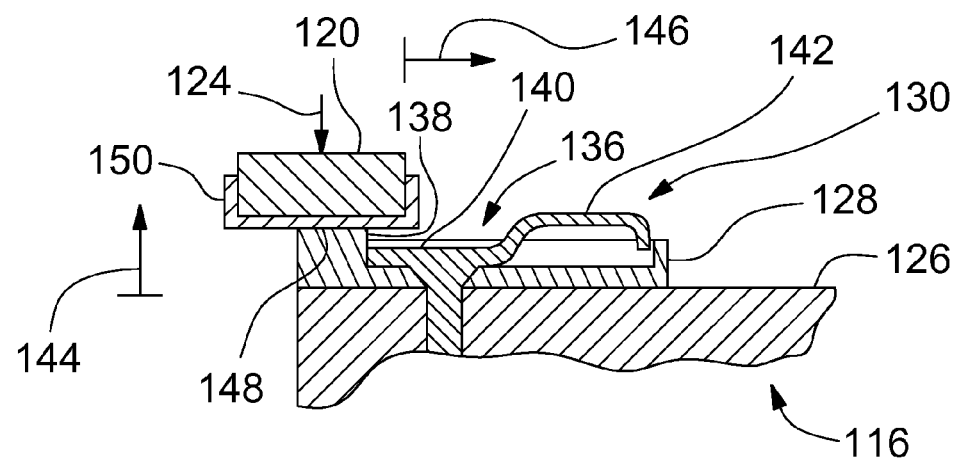
FIG. 4 is a schematic sectional view of a portion of a battery mounting system, taken along line 4-4 of FIG. 3.

FIGS. 3 and 4 illustrate a battery mounting system 110 for a battery assembly 112 in an automotive vehicle 114. Multiple cells 116, having cell shoulder contact areas 118, are arranged for mounting in the vehicle 114. A restraint 120 is placed across the cells 116. The restraint 120 is secured to an anchor 122 to exert a downward force (indicated by arrow 124) on the cell shoulder 118. The downward force 124 secures the cells 116 in the vehicle 114. The downward force 124 is illustrated as applied to a left cell shoulder of the cells 116, but as understood by one skilled in the art, the downward force 124 may also be applied to a right cell shoulder opposite the left cell shoulder or both the left and right cell shoulders.

Each cell 116 includes a top surface 126. A holder 136 is positioned on the top surface 126. The holder 136 incorporates insulator and extension portions 128 and 138, respectively. A terminal 130 is positioned in the insulator portion 128. The terminal 130 extends through the top surface 126 and insulator portion 128. The terminal 130 is fixed to the cell 116 by a suitable means known to one skilled in the art. For example, the terminal 130 may be fixed to the cell 116 by welding. The insulator portion 128 may be used to locate or position the terminal 130 prior to fixing the terminal 130 to the cell 16. The terminal 130 may be used to restrain the insulator portion 128 while the terminal 130 is fixed to the cell 116. The terminal 130 is electrically connected to a high voltage bus of the vehicle 114.

The terminal 130 has a lower portion 140 and an upper portion 142. The upper portion 142 is farther out, in a vertical direction 144 normal to the top surface 126, from the top surface 126 than the lower portion 140. The extension portion 138 of the holder 136 extends farther out, in the vertical direction 144, from the top surface 126 than the lower portion 140. This allows the restraint 120 to extend, in a horizontal direction 146 parallel to the top surface 126, and increase a contact area 148 between the restraint 120 and holder 136.

The upper portion 142 of the terminal 130 may be electrically connected to the high voltage bus while the lower portion 140 is not connected to the high voltage bus. The high voltage bus not being connected to the lower portion 140 further allows the restraint 120 to extend, in the horizontal direction 146, over the lower portion 140. Extending of the restraint 120 may end such that the restraint 120 does not exist over upper portion 142 which, as described, is required to connect to the high voltage bus of the vehicle 114

Alternatively, the extension portion 138 may extend farther out, in the vertical direction 144, from the top surface 126 than the lower portion 140 and the upper portion 142. As illustrated, the terminal 130 has lower and upper portions 140 and 142, respectively. The upper portion 142 may electrically connect the terminal 130 and the high voltage bus. Alternatively, the terminal 130 may have any suitable shape known to one skilled in the art and the extension portion 138 may extend farther out, in the vertical direction 144, than the terminal 130.

For a same sized battery cell, the contact area 148 is larger than the shoulder contact area 38 (shown in FIG. 2), which allows the downward force 124 to be distributed over a greater area. Likewise, as the restraint 120 extends farther in the horizontal direction 146 over the lower portion 140, an increased relative positional tolerance between the restraint 120 and the cell 116 is allowed while still maintaining the proportion of the contact area 148.

Alternatively, the extension portion 138 may extend farther, in the vertical direction 144, than the upper portion 142, which allows the restraint 120 to extend even farther in the horizontal direction 146. For example, the extension portion 138 may extend farther in the vertical direction 144 such that the restraint 120 may extend in the horizontal direction 146 over a portion of the upper portion 142 without contacting the upper portion 142.

The holder 136 separates the restraint 120 from the top surface 126. Additionally, the holder 136, including the extension portion 138, may be fabricated from an insulating material.

The holder 136 may be secured to the top surface 126 such that the holder 136 does not extend in the horizontal direction 146 beyond an extent of the top surface 126. The downward force 124 may clamp the holder 136 between the restraint 120 and the battery 112.

The restraint 120 may have an insulating layer 150 to prevent a possible electrical short between the restraint 120 and any of the top surface 126 or terminal 130.

Figure 5:
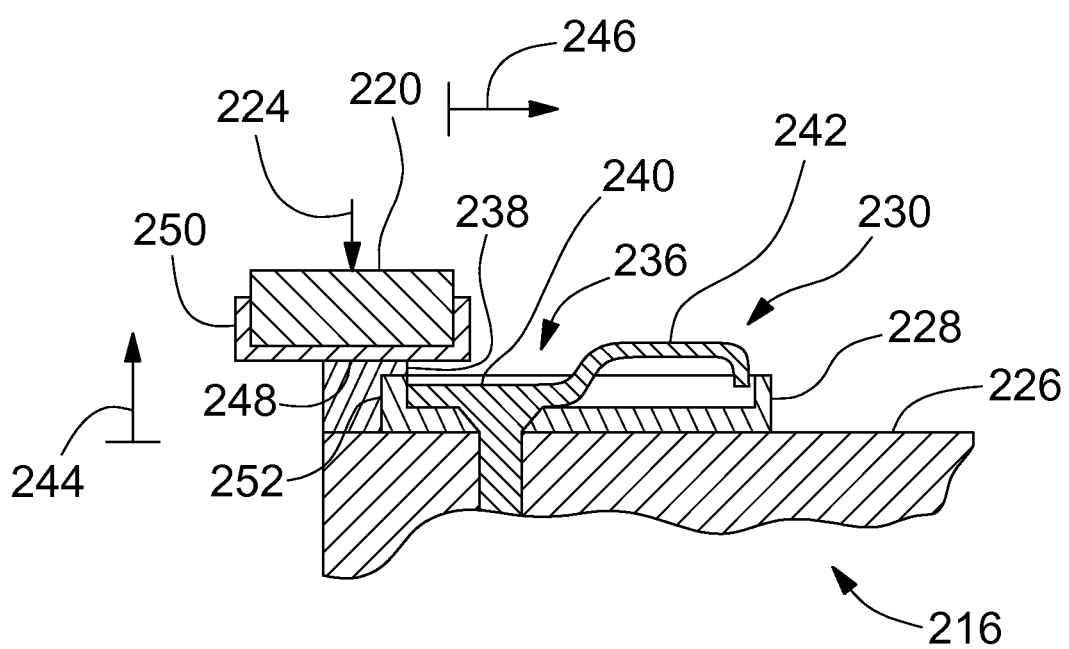
FIG. 5 is a schematic sectional view of a portion of a battery mounting system, similar to FIG. 4, but illustrating a different embodiment.

FIG. 5 illustrates a battery mounting system 210. Because the battery mounting system 210 is a variation of the battery mounting system 110 of FIGS. 3 and 4, like reference numerals, incremented by 100, designate corresponding parts in the drawings and detailed description thereof will be omitted.

As one skilled in the art will understand, a holder 236 may be comprised of separate insulator and extension portions 228 and 238, respectively, meeting at an interface 252. The illustrated arrangement of the interface 252 is a non-limiting example. The interface 252 may be by any suitable means known to one skilled in the art. As one skilled in the art will understand, the extension portion 238 may span between multiple of the cells in the battery.

While certain embodiments of the present invention have been described in detail, those familiar with the art to which this invention relates will recognize various alternative designs and embodiments for practicing the invention as defined by the following claims.

The invention claimed is:

1. A vehicle battery mounting system comprising:
cells, spaced from one another, each including a cell top surface having a shoulder extending along a same side of each cell top surface and a pair of terminals fixed to each cell;
insulating holders, each holder disposed at least between a respective cell top surface and a respective terminal, to insulate the terminal from the cell top surface, each holder further including a raised portion disposed on the shoulder;
a single restraint extending only along the shoulder of each cell top surface to exert a clamping force on the raised portion of each holder for securing each cell, the raised portion of each holder preventing the single restraint from contacting each terminal.

2. The system of claim 1 wherein the raised portion of the holder extends, in a direction normal to the cell top surface, farther out than the terminal and prevents the restraint from contacting the terminal.

3. The system of claim 1 wherein the holder is fixed between the cell top surface and restraint using a clamping connection.

4. The system of claim 1 wherein an extension portion of the holder spans between the plurality of cells forming the battery assembly.

5. The system of claim 1 wherein the holder is comprised of separate first and second portions, the first portion being located between the cell and terminal and the second portion extending, in the direction normal to the top surface, farther out than a portion of the terminal.

* * * * *